United States Patent [19]

Olsen et al.

[11] Patent Number: 5,200,082

[45] Date of Patent: * Apr. 6, 1993

[54] METHOD FOR REMOVING TOXIC SUBSTANCES FROM INDUSTRIAL AND AGRICULTURAL WASTE WATER

[75] Inventors: Orrie C. Olsen; Peter F. Santina, both of Walnut Creek, Calif.

[73] Assignee: Santina Water Company, Concord, Calif.

[*] Notice: The portion of the term of this patent subsequent to Jul. 10, 2007 has been disclaimed.

[21] Appl. No.: 724,993

[22] Filed: Jul. 2, 1991

[51] Int. Cl.$^5$ .................... C02F 1/48; C02F 1/70
[52] U.S. Cl. .................... 210/667; 210/688; 210/694; 210/695; 210/719; 210/721; 210/724; 210/726; 210/737; 210/912; 423/55; 423/508
[58] Field of Search .............. 210/660, 667, 681, 688, 210/694, 695, 719, 721, 724, 726, 737, 902, 912; 423/55, 508, 509

[56] References Cited

U.S. PATENT DOCUMENTS

| | | | |
|---|---|---|---|
| 3,933,635 | 1/1976 | Marchant | 210/719 |
| 4,026,797 | 5/1977 | Nikolic et al. | 210/719 |
| 4,137,162 | 1/1979 | Mohri et al. | 210/680 |
| 4,405,464 | 9/1983 | Baldwin et al. | 210/719 |
| 4,422,943 | 12/1983 | Fender et al. | 210/914 |
| 4,566,975 | 1/1986 | Allgulin | 210/912 |
| 4,725,357 | 2/1988 | Downng et al. | 210/912 |
| 4,807,264 | 2/1989 | Murphy | 210/695 |
| 4,915,928 | 4/1990 | Marcantonio | 210/670 |
| 4,940,549 | 7/1990 | Olsen et al. | 210/719 |
| 5,071,568 | 12/1991 | Bennett et al. | 210/754 |

Primary Examiner—Peter Hruskoci
Attorney, Agent, or Firm—Thomas M. Freiburger

[57] ABSTRACT

A method and system for removing toxic substances such as selenium from industrial and agricultural drain water, and particularly refinery effluent liquor, achieves very high removal of the toxic substance economically, by a chemical reduction process. Preferably, the effluent liquor is first filtered, which ordinarily is effective to remove selenium suspended in the liquor. Next the liquor is heated, preferably to about 150° F., and a reducing agent such as finely powdered iron is added to bring, for example, the selenium down from a +6 valence to +4 and lower valences. Sulfur is added to the slurry to greatly improve the effectiveness of the iron in reducing the liquor. The slurry is constantly agitated. After a reaction time which may be about 15 minutes, an oxidizing agent is added, with the temperature of the slurry then raised to at least about 180°, with continued agitation. This causes the selenium and/or toxic metals to form a separable precipitate, and the precipitate is separated from the remainder of the slurry. A high purity treated liquor is produced, and even higher purity can be achieved by putting this treated liquor through the process a second time.

25 Claims, 2 Drawing Sheets

METHOD FOR REMOVING TOXIC SUBSTANCES FROM INDUSTRIAL AND AGRICULTURAL WASTE WATER

BACKGROUND OF THE INVENTION

The invention relates to removal of toxic substances from water, and is particularly directed to removal of toxic metals or other toxic elements from industrial waste water as well as from agricultural tile drain water. Typically, such substances occur naturally in low concentrations but become concentrated through evaporation or bioaccumulation. Such substances include selenium.

The subject matter of this invention is related to that of U.S. Pat. No. 4,940,549, issued to the same assignee Jul. 20, 1990 and incorporated herein by reference. The patent discloses a process for removing selenium and other toxic substances/metals from agricultural tile drain water. Selenium is technically not a metal, but is sometimes referred to as an "amphoteric metal".

The process of the present invention is particularly concerned with removal of selenium from the effluent waste waters produced from petroleum refineries, although it is useful with other industrial effluent waters as well. Industrial processes include coal washing and many metallurgical processes, particularly precious metals process solutions after cyanide oxidation. The latter includes mine drainage and mineral processing waste, and particularly heap leach gold mine washings. In the case of some industrial processes there will also be, or there will alternatively be, molybdenum and/or other toxic metals present. The process of the invention is effective to remove most such toxic metals, as well as selenium.

In this specification and the accompanying claims, the term "selenium" is intended to refer to all soluble compounds of this element, as well as the elemental form itself.

A particularly acute problem of concentrated selenium discharge occurs in the waste waters from petroleum refineries. Many refineries have this problem, to a lesser or greater extent depending on the origin of the crude oil. As the selenium is isomorphous with sulfur, it accompanies sulfur in the processing of the oil. If selenium is present it generally accompanies sulfur in the oil. Crude oil taken from the San Joaquin Valley in California, for example, has a relatively high selenium content. In the waste water discharge from refineries processing this crude oil, selenium content has been high, above accepted levels of toxicity in San Francisco Bay where several refineries are located.

The selenium content of the effluent refinery liquor, at least in the case of Unocal's San Francisco refinery, originated from a combination of liquid streams of the refinery's segregated phenolic water system. Those streams included effluent from hydrotreating/reforming equipment, crude distillation and coking, hydrocracking, sulfur recovery plants and other miscellaneous small streams, placed in a common storage area. The various streams were mixed together in a common effluent, which had an average range of selenium from about 2.1 to about 6.1 parts per million or milligrams per liter. As discussed further below, the sample treated in testing in accordance with the invention had a selenium content of 4.87 parts per million.

Usually some treatment is performed on refinery effluent before it is discharged to a river or bay, sometimes granular carbon filtration. Most of the selenium remains in the effluent, including a large amount in suspension as well as that in solution.

Waste water effluent from the Unocal Corp. refinery in Rodeo, Calif. (discharged into San Francisco Bay) is typified by the data given in Table I.

TABLE I

UNOCAL CORP. REFINERY WASTE WATER ANALYSIS
(San Francisco Refinery, Rodeo, California)
(PHENOLIC WATER ANALYTICAL DATA)

Parameter
Flow ± 3500 bpd (= 102 gpm)   pH 7.0–8.8

| Parameter | Concentration (ppm) | Parameter | Concentration (ppm) Filterable | Total |
|---|---|---|---|---|
| COD | 4400–8100 | Ca (CaCO$_3$) | 5–15 | 5.5–16 |
|  |  | Mg (CaCO$_3$) | 2.4–8.9 | 2.6–9.7 |
| Cyanides | 3.0–18 | Na (CaCO$_3$) | 1400–1900 | 1400–1900 |
| Phenols | 80–158 | Ni | 0.1–0.6 | 0.2–1.29 |
| H$_2$S | 0.0–0.7 | K | 1.5–19 | 1.5–19 |
|  |  | As | — | 0.03–0.1 |
| NH$_3$ | 23–121 | Cr | — | 0.01–0.16 |
|  |  | Cu | 0.02–0.08 | 0.02–0.39 |
| N (total) | 158–204 | Fe | 0.93–3.5 | 1.6–4.1 |
|  |  | Se | — | 2.1–6.06 |
| Carboxylic Acids | 340–400 | Sr | 0.02–0.07 | 0.02–0.07 |
|  |  | Ti | — | 0.03–0.14 |
| Thiosulfate | 860–1200 | V | 0.02–0.1 | 0.02–0.15 |
| Thiocyanate | 31 | Zn | 0.02 | 0.02–0.13 |
| Cyanate | 2 | Al | 0.2 | 0.005–1.2 |
|  |  | Ag | — | <0.002–0.002 |
|  |  | Pb | <0.05 | <0.05 |
|  |  | Mn | <0.01–0.02 | <0.01–0.03 |
|  |  | B | 1.1–2.1 | 0.1 |
| Float Oil | 0.5–25.0 | P | — | <0.1–0.7 |
|  |  | Si(SiO$_2$) | 12–18 | — |
|  |  | S | 110–530 | 120–540 |
|  |  | Cl(CaCO$_3$) | 110–130 | — |
|  |  | SO$_4$(CaCO$_3$) | 66–120 | — |
|  |  | NO$_3$(CaCO$_3$) | 3 | — |
|  |  | NO$_2$ | <1–<5 | — |
|  |  | Ba | <0.1 | <0.1 |
|  |  | Mo | <0.1 | <0.1 |

TABLE I-continued

UNOCAL CORP. REFINERY WASTE WATER ANALYSIS
(San Francisco Refinery, Rodeo, California)
(PHENOLIC WATER ANALYTICAL DATA)

Parameter
Flow ± 3500 bpd (= 102 gpm)    pH 7.0-8.8

| Parameter | Concentration (ppm) | Parameter | Concentration (ppm) Filterable | Total |
|---|---|---|---|---|
| | | Sb | <0.1 | <0.1 |
| | | Cd | <0.01 | <0.01 |
| | | Co | <0.01 | <0.01 |
| | | Zr | <0.01 | <0.01 |

*Compiled from 1985-1991 data

Prior selenium removal systems and methods have been concerned primarily with mine waters and similar drain waters. Many efforts have been made, unsuccessfully, to remove selenium from agricultural drain waters (except as reported in U.S. Pat. No. 4,940,549) and from industrial effluent waters such as refinery waste water. It is known that selenium plus 6 valence can be reduced to selenium plus 4, which occurs as selenite. This can be reduced to elemental selenium at a valence of 0. This can be reduced further to a valence of minus 2 or selenide. A complicating factor in the agricultural drain waters (mentioned in U.S. Pat. No. 4,940,549) is the presence of nitrates originating from nitrogenous fertilizers, but nitrates are essentially absent from refinery waste water.

U.S. Pat. No. 4,405,464, issued to Kerr-McGee Nuclear Corporation, is pertinent to this invention in that it discloses a process for removing selenium from mine waters. The Kerr-McGee process involves passage of the liquid solution up through a column of iron particles. This would involve a very large amount of iron, with a limited amount of water passing through, and the process thus would appear not to be economically feasible for purposes of the present invention.

In the Kerr-McGee patent, zinc granules gave a modest reaction in attempting selenium recovery. Copper, manganese, magnesium and aluminum powders gave very modest selenium reaction.

Mayenkar U.S. Pat. No. 4,565,633 discloses a process for removal of dissolved heavy metals from waste effluents. The process disclosed in the patent is somewhat similar to that of the Kerr-McGee patent. Mayenkar suggested the use of coarse iron filings (optimally 35 to 45 mesh, U.S. Standard Sieve), in a bed into which the aqueous solution was introduced. A long contact time with the iron filings was relied upon in the disclosed process. A pilot plant was actually built in accordance with the teachings of the patent, to treat Firebaugh irrigation effluent, but the project was unsuccessful.

In U.S. Pat. No. 4,026,797, nickel, cobalt and iron gave reasonable recoveries of selenium at 180 psi autoclaving, at pH less than 3. Sodium sulfide and 5 grams per liter iron as ferric sulfate, also with autoclaving, was reported as giving a reasonable selenium conversion.

In U.S. Pat. No. 4,497,654, chromous sulfate reduction was used in metal sulfate solutions to effectively reduce 10 milligrams per liter selenium at 60° C. This would be unworkable, as the resultant chromium input would be almost as deleterious as the original selenium.

In U.S. Pat. No. 4,544,541, sodium borohydride at 5 grams per liter was effective in reducing 18 milligrams per liter of selenium down to about 1 milligram per liter. This could be optimized to be effective, but is much too expensive to be practical.

In refinery effluents, reverse osmosis is not seen as a workable process for separating selenium, because of oil and grease in the effluent water.

It is known that an iron hydroxide (ferrous iron) process has been tried with refinery water and has been found to work well for removing the selenite in the water column but not for removing selenate, elemental selenium or selenide.

An important object of the present invention is to efficiently and economically remove selenium (including selenate, selenite, elemental selenium and selenide) and other toxic substances from refinery waste water effluents and similar industrial effluents.

SUMMARY OF THE INVENTION

In one embodiment of the method of the present invention, for removing soluble selenium from a solution of industrial effluent liquor, the pH of the solution is first adjusted to an acid range, preferably about 2.0 to 6.0. A reducing agent, such as finely powdered iron, is added to the solution, with agitation of the resulting slurry to keep the reducing agent in suspension. Wettable elemental sulfur is also added to the slurry. The reducing agent (e.g. iron) and the sulfur are added in sufficient quantities to permit recovery of the selenium with the additional steps of the method.

During the time the iron and the sulfur are reacting in the solution, the slurry is agitated substantially continuously.

After a time within which the pH of the solution rises and then stabilizes (and the slurry turns green), an oxidizing agent is added, in an amount sufficient to effect selenium recovery as a precipitate. The slurry continues to be agitated substantially continuously (the color turns brown), until the precipitated selenium is recovered.

In one embodiment of the invention, the refinery waste water treated may initially have about 2 to 6 milligrams selenium per liter of solution (but it can be well outside these limits, requiring adjustment of reagent quantities).

A preferred reducing agent comprises iron in fine powder form, preferably at least as fine as 80% −325 mesh (U.S. Standard). The iron is effective when added in an amount of about 300:1 as compared to the selenium content by weight, and in any event more than 100:1 is believed required (100:1 produced no reaction with agricultural tile drain water, as reported in U.S. Pat. No. 4,940,549).

It has been found that optimally, the pH of the liquor, prior to addition of the reducing agent and the sulfur, is about pH 2.0 to 6.0, but the process will work to some degree anywhere in the acidic range and may function to remove some selenium even in the mildly alkaline range. This is a matter of degree, as to the extent and efficiency of selenium removal.

The temperature of the slurry may be about 150° F. with addition of the reducing agent and the sulfur, and with the temperature subsequently raised to about 180° F. to 200° F. after addition of the oxidizing agent.

The typical refinery waste water which has been processed in accordance with the principles of the invention, from the Unocal Corp. San Francisco Refinery, contained very low dissolved solids, much lower than that of the brine reported in U.S. Pat. No. 4,940,549. No steps were taken to concentrate the solution, in part because oil fractions were present in the water. The selenium content of the waste water was about 5 milligrams per liter and after filtration about 1.5 milligrams per liter.

The process of the invention, in one preferred embodiment, utilizes a combination iron and sulfur reduction, followed by a peroxide treatment. It has been found that relatively fine iron is required to provide reaction rates and iron dosages that are technically and economically feasible. Some selenium recovery can be effected with iron alone, or somewhat more efficiently with iron and sulfur alone. The peroxide, as explained below, acts primarily as a scavenger of selenite.

Although the process works well on the raw refinery effluent liquor without filtration, it has been found that an initial filtration step (activated carbon or clay or other filtration capable of removing suspended solids) will remove an appreciable portion of the selenium by eliminating nearly all suspended selenium and possibly some in solution. Over 60% of total selenium in the initial liquor can often be removed by such filtration, and this will reduce the amount of reagents needed in processing the liquor.

The very large amount of iron required in utilizing the prior art methods, in order to provide high selenium removal, has been found not required when a combination of sulfur and iron are used, with the subsequent peroxide treatment. The sulfur greatly increases the effectiveness of the iron in reducing the solution and this may be due to the combining of elemental selenium with the sulfur during the process.

It is therefore among the objects of the invention to greatly improve over prior selenium and toxic metals removal processes which have been suggested, and in particular to effectively and efficiently remove selenium from industrial waste waters, and in one specific embodiment, petroleum refinery effluent waters. These and other objects, advantages and features of the invention will be apparent from the following description of preferred embodiments, considered along with the accompanying drawing.

DESCRIPTION OF PREFERRED EMBODIMENTS

As outlined above, a typical sample of refinery effluent waste water had a selenium content of about 5 mg per liter, with very low total dissolved solids content. A selenium content of one milligram per liter is considered a toxic level, and the sample content was far too rich in selenium to meet target selenium levels for discharge into rivers and other waterways.

The flow diagram of the drawing indicates principal steps in the selenium removal process.

Figure 1:
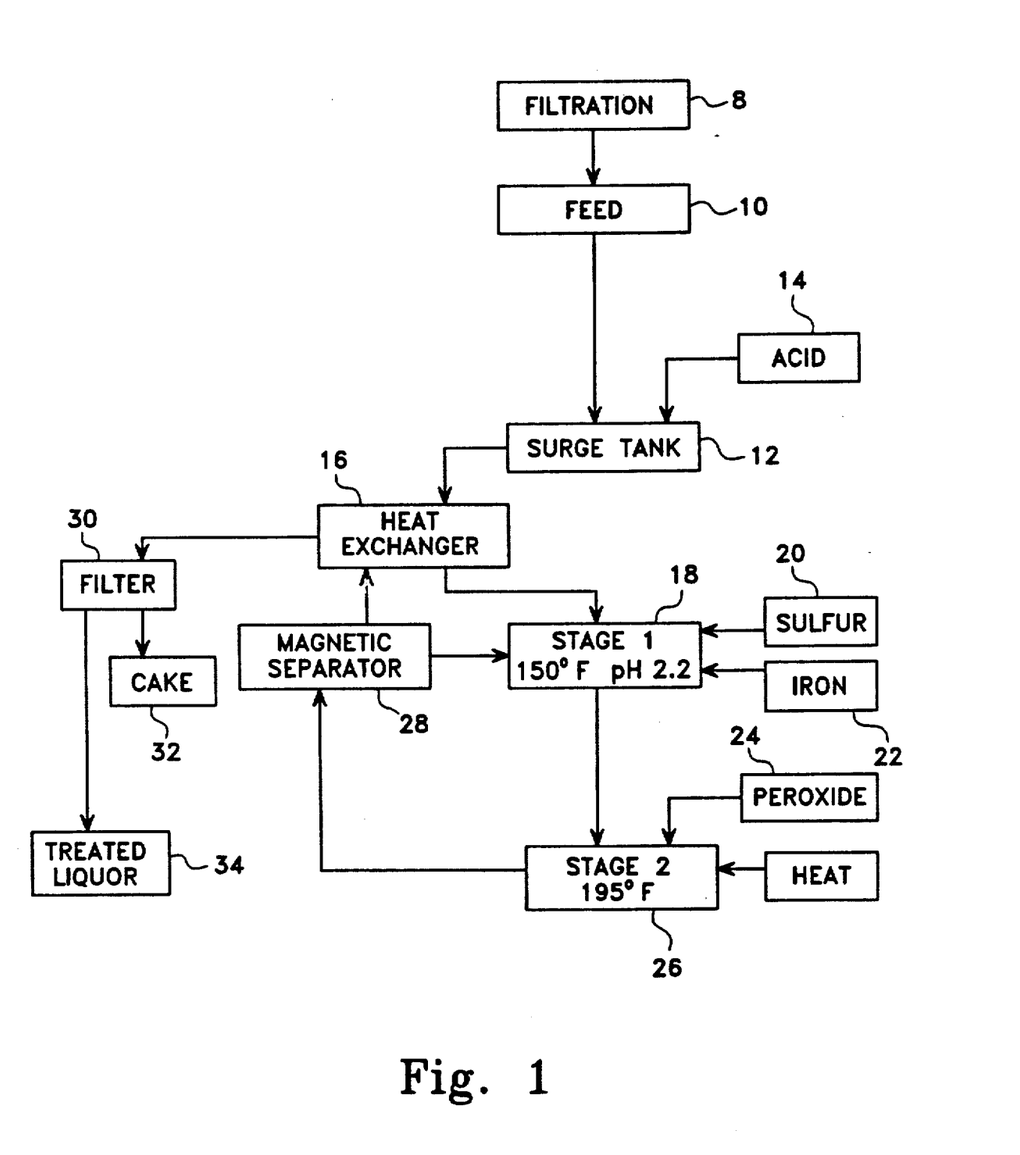
FIG. 1 is a schematic flow chart diagram indicating an overall process according to the invention for removal of toxic selenium from waste waters such as industrial waters.

First, a filtration step shown in the block 8 preferably is conducted on the input waste water, using an appropriate inorganic filter material. The material preferably is activated, but may be inactivated. Activated charcoal is one preferred material, and in particular, DARCO 20×40, a fine meshed granular activated carbon from American Norit Company of Atlanta, Ga. worked effectively in the Examples outlined below. This step can remove a portion of the selenium, e.g. over 60%, as well as removing other objectionable substances such as floating and suspended hydrocarbons. In the refinery effluent sample discussed below, total selenium content was reduced from about 5 mg per liter to about 1.5 mg per liter.

The filtrate feed (or raw liquor if filtration is not used) is indicated in the block 10. The feed liquor is fed into a surge tank 12, where acid 14 is added to bring the pH of the liquor into the desired range—preferably 2.0 to 6.0, and optimally about 2.0 to 3.0. The pH-adjusted liquor is then passed through a heat exchanger 16, where it is heated preferably to about 150° F., or at least to some elevated temperature, prior to introduction to a Stage I treatment tank 18 as shown. 150° has been found to be a convenient operating temperature in the Stage I tank, assuming reaction time and reagent quantities as stated below. It is not critical that the temperature be at 150°; generally, reaction time is longer at lower temperatures and vice versa.

For a liquor having a filtered concentration of about 1.5 mg/L selenium, 450 mg sulfur and 450 mg iron per liter were added to the Stage I tank, with the slurry maintained at about 150° F. The acidity of the liquor at the time of iron and sulfur addition was about pH 2.2.

In the Stage I reaction, it has been found that very large amounts of iron are required to reduce the selenium in the liquor, if iron alone is relied upon at this stage. This would apparently also be the case if other reducing agents were used alone. For example, as discussed in U.S. Pat. No. 4,940,549, in a solution of agricultural drain water containing 18 milligrams per liter selenium, and using fine iron having a particle size of 80% −325 mesh ("Ancor Grade B iron" as designated by Hoeganaes Company of Riverton, N.J.) or finer, it was found that 25–26 grams per liter of iron were required. This amount was required to reduce the solution and provide recoverable selenium to the extent achieved by the preferred method, and it was in combination with the later oxidizing step as explained in the patent.

With the addition of sulfur in quantities as described in the referenced patent, the amount of iron, in similar particle size as just described above, was reduced from 26 grams per liter down to about 4 grams per liter, assuming the same liquor being treated.

The amount of iron required, and the amount of sulfur required as well, depend upon the total content of selenium in the liquor. The liquor can be concentrated somewhat if practical for the particular liquor under the treatment circumstances, but it need not be concentrated at all if desired. In the full-dilution case much lower amounts of iron and sulfur per liter are required, since the amounts of iron and sulfur required are dependent upon the amount of selenium present.

Thus, it has been found that the preferred 80% −325 mesh iron is effective in an amount by weight of about 300:1 as compared to the amount by weight of selenium in solution in the waste water. It may be effective in somewhat lower quantity. If preliminary filtration is not used and additional selenium is in suspension in the liquor, as well as in solution, a higher ratio of iron to selenium may be required.

With the sulfur, it has been found that an amount by weight of about 300:1 as compared to the amount by weight of selenium is effective. The sulfur may be effective in somewhat lower concentration. Again, a higher ratio of sulfur to total selenium may be needed for unfiltered liquors.

Finer iron may be used, in somewhat smaller quantities to produce the same result. However, the results are not improved commensurate with the cost since finer iron is far more expensive, making the process less economically feasible.

At a temperature of about 150° F., 15 minutes is sufficient reaction time in the Stage I reaction; at lower temperatures, longer times are necessary. The slurry of liquor, iron and sulfur agitated substantially constantly in the Stage I tank, to prevent scaling up and falling out of iron from the slurry.

After adequate Stage I reaction time, the slurry has turned green in color. During the reaction the pH of the slurry rises; e.g., if the initial pH is 2.2, it rises to about 2.6.

After the completion of this Stage I reaction, as evidenced by the green color and the rise in and stabilization of the pH, about 16 ml/liter of 3% hydrogen peroxide is added for an initial liquor with about 5 mg per liter selenium, indicated at 24 in the drawing figure. This begins the Stage II reaction, indicated in the block 26 in the drawing. Agitation of the slurry continues, and the temperature of the slurry is preferably raised to about 180° to 200° F. (or just under boiling), most preferably about 190° to 195° F. The slurry turns to a rust color within seconds. In this stage the ferrous iron is turned to the ferric stage as ferric hydroxide, which acts as a selenite scavenger.

After a total retention time of 30 minutes to two hours (including Stages I and II), the slurry is cooled and filtered. Precoat filter may be required.

As shown in the drawing, the reactor discharge may be denuded of magnetic iron in a magnetic separator 28, if required for reasons of economy. This iron can be recycled back to the Stage I reactor, in an attempt to minimize the amount of fresh iron required. Some of this iron may not be reactive, and if the non-reactive iron builds up it eventually may have to be removed and not recycled.

As indicated in the drawing, the hot liquor can subsequently be passed through the heat exchanger 16 to heat the feed liquor moving between the surge tank 12 and the Stage I reactor.

The treated liquor, thus cooled, can then be filtered on a vacuum filter 30 as well as a pressure filter, depending on end requirements. A precoat may be used to minimize contamination of the filter by the seleniferous solid. For vacuum filtration, the liquor should be at a temperature below 150° F.

The drawing shows the products of filtration as a solid filter cake 32, and treated liquor 34. The filter cake can be a saleable commodity in locations where selenium is deficient for animal nutrition.

The results of selenium removal procedure as described above in reference to the drawing are shown in Table II. The procedure was performed twice, on two identical samples of refinery effluent liquor, represented in Examples 1 and 2.

EXAMPLE 1

A five gallon sample of sour water or effluent liquor was received from Unocal's San Francisco Refinery, from the segregated phenolic process water stream of the refinery (see Table I above).

Prior to the reaction step the sour water was filtered through an active carbon filter. A sample of 800 ml volume was put through 35 g of activated carbon, composed of roughly ¼ inch of activated carbon between two layers of filter paper. About 300 ml was filtered before discoloration of the filtrate appeared. A second filter element was used to produce a near colorless filtrate. This was sample No. 1. This filtrate (800 ml) was acidified to pH 2.2 with normal sulfuric acid. This was then heated to about 140° F. and 0.36 g each of sulfur and iron powder (Hoeganaes No. 391 or Ancor Grade B) were added to the reaction vessel and stirred or agitated to keep the iron in suspension.

After a thirty minute retention time, a portion of the suspension was filtered to retrieve a sample No. 2. At that time the pH of the filtrate was 2.6, and the temperature had been raised to 190° F.

Next, 16 ml of 3% hydrogen peroxide was added to the solution, to convert the ferrous iron to rust-colored ferric hydroxide. The suspension was kept at about 190°–195° F., and after elapsed times (elapsed times refer back to the point of acid and reagents addition) of 40 minutes, 50 minutes, one and one-half hours and two hours, samples Nos. 3, 4, 5 and 6 were taken and analyzed.

Sample No. 2 (30 minutes) was taken after the iron and sulfur were added (the iron and sulfur were added immediately after the acid). Sample No. 3 was taken 10 minutes after addition of the peroxide; No. 4, 20 minutes after addition of the peroxide; No. 5, one hour after the addition of peroxide; and sample No. 6, one and a half hours after addition of the peroxide.

The table below gives the results of the selenium analysis for each of samples 1 through 6.

Based on 100% selenium in the unfiltered sample, filtration removed about 69% of the selenium in Example 1. The total selenium removal, represented by samples 5 and 6 as compared to the original selenium content, was about 94% (about 80% as compared to the filtered selenium content of sample 1).

TABLE II

| SELENIUM REMOVAL TEST SUMMARIES | | |
|---|---|---|
| Liquor[1] | EXAMPLE 1 | EXAMPLE 2 |
| Initial pH | 2.2 | 3.5 |
| Temperature | 150–195 | 150–195 |
| Iron Powder[2] gr/liter | .45 | .67 |
| Sulfur gr/liter | .45 | .67 |
| $H_2O_2$ 3% mil/liter | 16 | 16 |
| Initial Selenium mg/liter | 4.9 | 4.9 |
| Sample 1: | | |
| Selenium after filtration, mg/liter | 1.5 | 2.1 |

TABLE II-continued
SELENIUM REMOVAL TEST SUMMARIES

| Liquor[1] | EXAMPLE 1 | EXAMPLE 2 |
|---|---|---|
| Sample 2: | | |
| Selenium after iron/sulfur, mg/liter | 0.69 | |
| Sample 3: | | |
| Selenium remaining mg/liter | 0.33 | |
| Sample 4: | | |
| Selenium remaining mg/liter | 0.39 | 0.57 |
| Total Time | 50 minutes | |
| Sample 5: | | |
| Selenium remaining mg/liter | 0.29 | |
| Total Time | 1.5 hour | |
| Sample 6: | | |
| Selenium remaining mg/liter | 0.31 | |
| Total Time | 2 hours | |

[1]Unocal S.F. Refinery Effluent "Phenolic Water", both examples
[2]Powder sizing 80% −325 U.S. Mesh.

EXAMPLE 2

Example 2 differed from Example 1 in that the initial pH was higher and the selenium, after filtration, was higher. The sample for Example 2 came from the same source, and both samples were subjected to active carbon filtration, but the sample of Example 2 was not as thoroughly filtered. Conclusions from these tests and also taking into account the tests conducted in U.S. Pat. No. 4,940,549, show the following:

1. Examples 1-2 show that the process of the invention works well within a range of acidity of about 2 to 3.5, but it is believed the process will work well within a wide acidic range, as demonstrated in U.S. Pat. No. 4,940,549. The process may work even into a mildly alkaline range.
2. Sulfur is required and may be used in quantities similar to the iron, although lower quantities may be effective.
3. Iron and sulfur with no peroxide treatment yield some selenium removal (as opposed to the result reported in U.S. Pat. No. 4,940,549).
4. Total reaction time, with the final temperature in the 180°-200° F. range, can be about 30 minutes to two hours.
5. Both the Stage I and the Stage II effective temperatures comprise broad ranges. The higher Stage II range can be up to just below boiling, with lower temperatures requiring longer reaction times.
6. Agitation sufficient to suspend the iron powder is required to prevent scaling.
7. "Grade B" iron is effective in an amount of about 300:1 as compared to the selenium content by weight. The amount of iron must be greater than 100:1, as discussed in U.S. Pat. No. 4,940,549.
8. The selenium recovery in Example 2 was very good, although not as thorough as in Example 1. Since Example 2 had less complete initial filtration of the liquor, the filtered Example 2 liquor was believed to contain more suspended selenium. The mix of species of selenium (selenate, selenite, selenium and selenide) could have been different in the sample of Example 2. Although the ratio of iron to selenium and sulfur to selenium was slightly higher in Example 2 (about 330:1 as compared to 300:1), recovery was less complete.

Although fine iron is preferred as a reducing agent, other reducing agents than iron may be used in combination with sulfur to reduce selenium effectively. These will include metals and/or reducing agents with sufficient reduction potential to reduce the selenate (Se 6+) to a recoverable form, such as magnesium, aluminum and zinc powders and hydrides, sodium borohydride, and other reductors.

Also, oxidizing agents other than peroxide may be used in the oxidation step of this process. These might include known industrial oxidants such as chlorine, ozone, etc., or even oxygen or simple air, introduced under pressure.

The time and temperature are, to some degree, interchangeable in this process. Lower temperatures require more reduction time in the final step.

Figure 2:
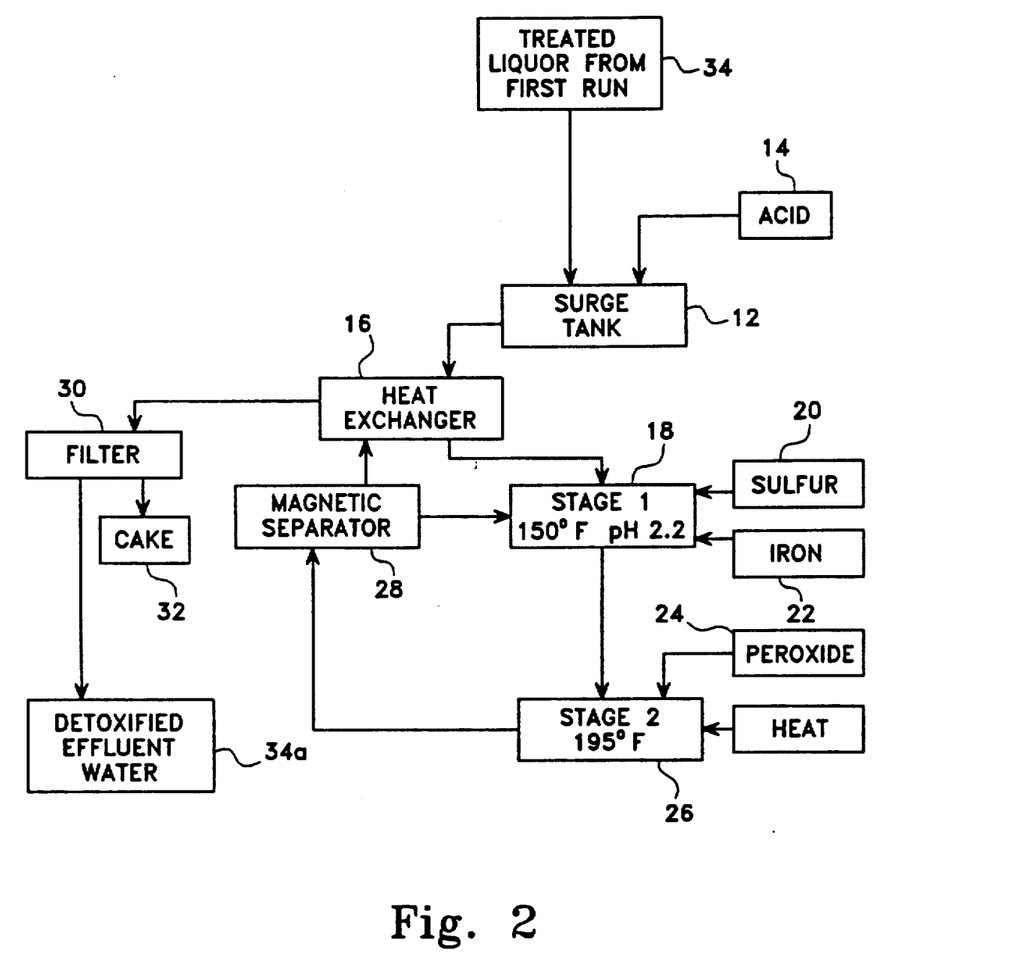
FIG. 2 is a schematic flow chart similar to FIG. 1, indicating a second iteration of the process to achieve a higher level of selenium removal.

Example 1 in Table II shows that selenium recovery seems to be fixed shortly after a short time of reaction in Stage II. This differs from the results obtained in U.S. Pat. No. 4,940,549, wherein Table II of that patent showed the selenium reaction to continue dramatically, at least up to two hours of total reaction time. The different liquor in the present examples produced a different result in this regard, although total selenium recovery was nonetheless dramatic. It is believed that with these refinery liquors selenium can be removed virtually completely by another iteration of the process described, taking the treated liquor at 34 in the drawing through the process as described, with the search tank, Stage I and Stage II reactions. This is indicated in FIG. 2.

Although excellent selenium recovery is evidenced by Examples 1 and 2, achieving in Example 1 a 94% selenium recovery based on the raw liquor and an 80% selenium recovery based on the filtrate liquor, it is believed virtually all the selenium in the liquor can be removed if the treated liquor indicated at 34 in FIG. 1 is put through the same process again. FIG. 2 indicates such a second iteration of the process, wherein the treated liquor from the first run is input to the surged tank 12, just as was the filtered feed liquor 10 in the first iteration shown in FIG. 1.

It is believed that the detoxified effluent water 34a, after the second iteration of the process of the invention, will exhibit 98% total selenium removal or better.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for removing soluble selenium from a liquor of industrial waste water containing selenium, comprising,
   adjusting the pH of the liquor to an acid range,
   adding a reducing agent to the liquor, with agitation, to form a slurry with the liquor and reducing agent,
   adding wettable elemental sulfur to the liquor,
   the amounts of the reducing agent and of the sulfur being selected in combination to permit recovery of the selenium with additional steps of:
   continuing to agitate the slurry,
   after a period of time within which the pH of the slurry rises and then stabilizes, oxidizing the slurry sufficiently to effect selenium recovery as a precipitate, and continuing to agitate the slurry substantially continuously, and separating the recovered, precipitated selenium to produce a treated liquor low in selenium.

2. The method of claim 1, wherein the reducing agent consists essentially of iron in fine powder form, added in an amount of more than 100:1 as compared to the selenium content by weight.

3. The method of claim 1, wherein the industrial waste water liquor comprises precious metals process solutions after cyanide oxidation.

4. The method of claim 2, wherein the iron has a grain size at least as small as about 80% −325 mesh.

5. The method of claim 1, wherein the oxidizing step comprises adding hydrogen peroxide solution to the slurry.

6. The method of claim 1, wherein the pH of the liquor in the adjusting step is adjusted to about pH 2.2.

7. The method of claim 1, wherein the reducing agent consists essentially of fine, dispersible powdered iron.

8. The method of claim 7, further including, following reaction by the powdered iron, using a magnetic separator to remove uncombined iron particles from the slurry.

9. The method of claim 1, wherein the temperature of the slurry is established at about 150° F. with addition of the reducing agent and the sulfur.

10. The method of claim 9, wherein the temperature of the slurry is raised to about 190° F. after addition of the oxidizing agent.

11. The method of claim 1, wherein the reducing agent consists essentially of dispersible iron in fine powder, and wherein the amount by weight of iron is more than 100:1 and the amount by weight of sulfur as at least about 100:1 as compared to the amount by weight of selenium in solution in the liquor just preceding the addition of the iron and sulfur.

12. The method of claim 1, wherein the industrial waste water is effluent liquor from a petroleum refining process, and further including filtering the effluent liquor prior to addition of the reducing agent.

13. The method of claim 12, wherein the filtering step comprises filtering the liquor through a filter bed of granular activated carbon.

14. The method of claim 1, further including effecting further selenium recovery by reiterating the defined method, performing the steps of claim 1 on the treated liquor produced in the first iteration of the method.

15. A method for removing soluble selenium from petroleum refinery effluent liquor containing selenium, comprising, adjusting the pH of the liquor to an acid range, adding a reducing agent to the liquor, with agitation of the resulting slurry to keep solids in suspension, using wettable sulfur to increase the effectiveness of the reducing agent in reducing the selenium in the liquor, by adding it to the liquor, keeping the slurry of the liquor and the reducing agent and sulfur agitated to prevent scaling up and falling out of reducing agent from the slurry, while maintaining the slurry at a sufficient temperature for selenium recovery, adding an oxidizing agent in an amount sufficient to effect selenium recovery as a precipitate, while continuing to agitate the slurry, and after sufficient reaction time at an elevated, above ambient temperature sufficient to effect selenium recovery, separating the recovered, precipitated selenium.

16. The method of claim 15, wherein the reducing agent is iron powder having a grain size at least as fine as 80% −325 mesh (U.S. Standard).

17. The method of claim 16, wherein the amount by weight of iron is more than 100:1 and the amount by weight of sulfur is at least about 100:1, as compared to the amount by weight of selenium in solution in the liquor just preceding the addition of the iron and sulfur.

18. The method of claim 17, wherein the amount by weight of iron is about 300:1 as compared to the amount by weight of selenium in solution in the liquor.

19. The method of claim 16, wherein the amount by weight of each of the iron and sulfur is about 300:1 as compared to the amount by weight of selenium in solution in the liquor just preceding the addition of the iron an sulfur.

20. The method of claim 15, wherein the slurry is maintained at about 150° F. after addition of the reducing agent and sulfur and until the pH stabilizes, and is raised to at least about 180° F. and maintained at that temperature while the oxidizing agent reacts in the slurry.

21. A method for removing selenium from petroleum refinery effluent liquor having selenium present, comprising, (a) filtering the effluent liquor to initially remove filterable selenium, (b) adjusting the pH of the liquor to an acid range, (c) adding a reducing agent to the liquor, with agitation, and forming a slurry with the liquor and reducing agent, (d) adding wettable elemental sulfur to the liquor, (e) the amounts of the reducing agent and of the sulfur being selected in combination to permit recovery of the selenium with additional steps of:

(f) continuing to agitate the slurry, (g) after a period of time within which the pH of the slurry rises and then stabilizes, adding an oxidizing agent in an amount sufficient to effect recovery of a product including selenium as a precipitate, and continuing to agitate the slurry substantially continuously, and (h) separating the recovered, precipitated product to produce a treated liquor very low in selenium.

22. The method of claim 21, further including effecting further selenium recovery by performing steps (b) through (h) on the treated liquor produced in accordance with claim 20.

23. A method for removing selenium from petroleum refinery effluent liquor having selenium present in suspension as well as in solution, comprising, filtering the refinery effluent liquor to remove filterable selenium, using activated inorganic filtering material, reducing the filtered liquor using a reducing agent and wettable elemental sulfur to form a slurry including the filtered liquor, oxidizing the slurry to form a recovery product including selenium as a precipitate, and separating the recovery product to produce a treated liquor low in selenium.

24. The method of claim 23, wherein the filtration is conducted using granular activated carbon as the filtering material.

25. A method for removing soluble selenium and/or toxic metals from a liquor of industrial waste water, comprising, adjusting the pH of the liquor to an acid range, adding a reducing agent to the liquor, with agitation of the resulting slurry to keep solids in suspension, using wettable sulfur to increase the effectiveness of the reducing agent in reducing the selenium in the liquor, by adding it to the liquor, keeping the slurry of the liquor and the reducing agent and sulfur agitated to prevent scaling up and failing out of reducing agent from the slurry, while maintaining the slurry at a temperature sufficient for selenium and/or toxic metal recovery, adding an oxidizing agent in an amount sufficient to effect recovery of the selenium and/or toxic metals as a precipitate, while continuing to agitate the slurry, and after sufficient reaction time at an elevated, above ambient temperature sufficient to effect selenium and/or toxic metal recovery, separating the recovered, precipitated selenium and/or toxic metals.

* * * * *

UNITED STATES PATENT AND TRADEMARK OFFICE
CERTIFICATE OF CORRECTION

PATENT NO. : 5,200,082
DATED : April 6, 1993
INVENTOR(S) : Orrie C. Olsen, Peter F. Santina It is certified that error appears in the above-indentified patent and that said Letters Patent is hereby corrected as shown below:

Column 12, line 52:

Correct "20" to read --21--

Column 13, line 12:

Correct "failing" to read --falling--

Signed and Sealed this

Eighth Day of February, 1994

BRUCE LEHMAN

Attest:

Attesting Officer        Commissioner of Patents and Trademarks